(12) United States Patent
Stokes et al.

(10) Patent No.: US 8,544,581 B2
(45) Date of Patent: Oct. 1, 2013

(54) DRIVE SYSTEM FOR MULTIPLE MOVABLE SYSTEMS

(75) Inventors: Peter John Stokes, Rochester Hills, MI (US); Patrick Fenchak, Rochester Hills, MI (US)

(73) Assignee: SRG Global, Inc., Warren, MI (US)

( * ) Notice: Subject to any disclaimer, the term of this patent is extended or adjusted under 35 U.S.C. 154(b) by 332 days.

(21) Appl. No.: 13/079,372

(22) Filed: Apr. 4, 2011

(65) Prior Publication Data

US 2012/0247018 A1 Oct. 4, 2012

(51) Int. Cl.
*E06B 7/086* (2006.01)

(52) U.S. Cl.
USPC .......................................... 180/68.1; 49/89.1

(58) Field of Classification Search
USPC ........... 180/68.1, 68.3, 68.6, 69.24; 454/155, 454/307, 308, 309, 310, 311, 312, 313, 314, 454/315, 316, 317, 318, 319, 320, 321, 325, 454/326, 327, 330, 331, 332, 154; 49/89.1, 49/358, 74.1, 82.1, 86.1; 251/212
See application file for complete search history.

(56) References Cited

U.S. PATENT DOCUMENTS

| | | | | |
|---|---|---|---|---|
| 1,699,020 | A | * | 1/1929 | Raleigh ............................ 165/98 |
| 1,737,946 | A | * | 12/1929 | Rood ............................... 49/80.1 |
| 1,876,850 | A | * | 9/1932 | Burgess ........................... 49/90.1 |
| 1,893,459 | A | * | 1/1933 | Thomas ........................... 109/12 |
| 2,174,358 | A | * | 9/1939 | Blumenthal .................... 165/98 |
| 4,064,934 | A | | 12/1977 | Kolthoff, Jr. et al. |
| 4,457,558 | A | | 7/1984 | Ishikawa |
| 4,534,506 | A | | 8/1985 | Ishida et al. |
| 4,753,288 | A | | 6/1988 | Harvey |
| 5,470,276 | A | * | 11/1995 | Burnell et al. ................ 454/155 |
| 5,732,666 | A | | 3/1998 | Lee |
| 5,734,727 | A | | 3/1998 | Flaherty et al. |
| 6,174,025 | B1 | * | 1/2001 | Henderson et al. ........... 296/217 |

(Continued)

FOREIGN PATENT DOCUMENTS

| | | |
|---|---|---|
| DE | 2908734 A1 | 9/1980 |
| DE | 3151435 A1 | 7/1982 |

(Continued)

OTHER PUBLICATIONS

International Search Report regarding Application No. PCT/US2010/001939, mailed Oct. 6, 2010.

(Continued)

*Primary Examiner* — John R Olszewski
*Assistant Examiner* — Brodie Follman
(74) *Attorney, Agent, or Firm* — Harness, Dickey & Pierce, PLC (57) ABSTRACT

A system may include first and second louvers and a drive system. The first louver may be movable between first and second positions. The second louver may also be movable between first and second positions. At least one of the first and second louvers may be positioned proximate an opening in a vehicle, such as a grille, to control airflow therethrough. The drive system may drive at least one of the first and second louvers between the first and second positions. The drive system may include a first member connected to the at least one of the first and second louvers, and a rotatable member having a first arcuate guide. The first arcuate guide may slidably engage the first member. The rotatable member may rotate to cause movement of the at least one of the first and second louvers.

23 Claims, 5 Drawing Sheets

(56) References Cited

U.S. PATENT DOCUMENTS

| | | | |
|---|---|---|---|
| 6,340,328 B1* | 1/2002 | Schwandt et al. | 454/155 |
| 6,430,873 B1* | 8/2002 | Borchuk et al. | 49/352 |
| 6,553,719 B1* | 4/2003 | Stone et al. | 49/358 |
| 6,695,047 B2 | 2/2004 | Brocksopp | |
| 6,796,895 B2* | 9/2004 | Demerath | 454/155 |
| 7,498,926 B2 | 3/2009 | Browne et al. | |
| 7,604,533 B2* | 10/2009 | Ogura et al. | 454/155 |
| 7,677,628 B2* | 3/2010 | Lowentat et al. | 296/57.1 |
| 7,717,208 B2 | 5/2010 | Knauer | |
| 7,757,643 B2* | 7/2010 | Harich et al. | 123/41.04 |
| 7,866,737 B2 | 1/2011 | Browne et al. | |
| 8,011,136 B2* | 9/2011 | Fukumura et al. | 49/360 |
| 8,091,516 B2 | 1/2012 | Preiss | |
| 8,161,919 B2 | 4/2012 | Klotz et al. | |
| 2001/0017479 A1 | 8/2001 | Birndorfer et al. | |
| 2002/0153182 A1 | 10/2002 | Vaillancourt et al. | |
| 2006/0060401 A1 | 3/2006 | Bole | |
| 2006/0102399 A1 | 5/2006 | Guilfoyle et al. | |
| 2007/0077880 A1 | 4/2007 | Lee et al. | |
| 2009/0066096 A1 | 3/2009 | Doroghazi et al. | |
| 2009/0140549 A1 | 6/2009 | Doroghazi et al. | |
| 2010/0029191 A1* | 2/2010 | Arndt et al. | 454/154 |
| 2010/0071977 A1 | 3/2010 | Ritz et al. | |
| 2010/0083918 A1* | 4/2010 | Tregnago et al. | 123/41.05 |
| 2010/0120347 A1* | 5/2010 | Gehring et al. | 454/155 |
| 2010/0139583 A1 | 6/2010 | Klotz et al. | |
| 2010/0236503 A1 | 9/2010 | Bernt et al. | |
| 2010/0243351 A1 | 9/2010 | Sakai | |
| 2010/0243352 A1* | 9/2010 | Watanabe et al. | 180/68.1 |
| 2010/0263282 A1* | 10/2010 | Maciulewicz | 49/82.1 |
| 2010/0282533 A1 | 11/2010 | Sugiyama | |
| 2011/0005851 A1 | 1/2011 | Doroghazi et al. | |
| 2011/0070817 A1* | 3/2011 | Walters | 454/155 |
| 2011/0073395 A1 | 3/2011 | Lee et al. | |
| 2011/0247779 A1* | 10/2011 | Charnesky et al. | 165/41 |
| 2012/0060776 A1* | 3/2012 | Charnesky et al. | 123/41.05 |
| 2012/0067655 A1 | 3/2012 | Charnesky et al. | |
| 2012/0074729 A1 | 3/2012 | Fenchak et al. | |
| 2012/0110909 A1* | 5/2012 | Crane et al. | 49/70 |
| 2012/0119059 A1 | 5/2012 | Crane et al. | |
| 2012/0132474 A1* | 5/2012 | Charnesky et al. | 180/68.1 |
| 2012/0137588 A1* | 6/2012 | Qian et al. | 49/89.1 |
| 2012/0159850 A1* | 6/2012 | Couturier et al. | 49/82.1 |
| 2012/0233924 A1* | 9/2012 | Kitterman | 49/77.1 |
| 2012/0247018 A1* | 10/2012 | Stokes et al. | 49/89.1 |
| 2012/0312611 A1* | 12/2012 | Van Buren et al. | 180/68.1 |
| 2013/0025952 A1* | 1/2013 | Kitashiba et al. | 180/68.1 |
| 2013/0068403 A1* | 3/2013 | Fenchak et al. | 160/218 |
| 2013/0081888 A1* | 4/2013 | Charnesky et al. | 180/68.3 |

FOREIGN PATENT DOCUMENTS

| | | |
|---|---|---|
| DE | 3929023 C1 | 9/1990 |
| DE | 20021023 U1 | 2/2001 |
| DE | 102004048038 A1 | 4/2006 |
| DE | 102006054970 A1 | 5/2008 |
| EP | 2371602 A1 | 10/2011 |
| FR | 2404557 A1 | 4/1979 |
| JP | 64-018744 | 1/1989 |
| JP | 64018744 U | 1/1989 |
| JP | 01277616 A | 11/1989 |
| JP | 2001-048058 | 2/2001 |
| JP | 2001048058 A | 2/2001 |
| WO | 2006056359 A1 | 6/2006 |
| WO | WO-2007108803 A1 | 9/2007 |
| WO | 2011008253 A1 | 1/2011 |
| WO | 2011009212 A1 | 1/2011 |

OTHER PUBLICATIONS

International Search Report and Written Opinion regarding Application No. PCT/US2012/026428, mailed Nov. 30, 2012.

U.S. Office Action regarding U.S. Appl. No. 12/801,403 mailed Aug. 21, 2012.

U.S. Office Action regarding U.S. Appl. No. 13/239,527 mailed Dec. 5, 2012.

International Search Report and Written Opinion regarding Application No. PCT/US2011/052710 issued Apr. 30, 2012.

International Preliminary Report on Patentability regarding International Application No. PCT/US2010/001939 issued Jan. 17, 2012.

International ISR and Written Opinion dated Nov. 29, 2012.

* cited by examiner

DRIVE SYSTEM FOR MULTIPLE MOVABLE SYSTEMS

FIELD

The present disclosure relates to a drive system for one or more movable systems, and more particularly, to a drive system for one or more shutter assemblies.

BACKGROUND

This section provides background information related to the present disclosure and is not necessarily prior art.

Many automotive vehicles include a grille mounted to a front end of the vehicle. Grilles are often an integral component of the vehicle's aesthetic appeal and may serve to identify a brand of the vehicle. Aesthetic appeal and marketing considerations can be just as important or more important design factors than the functionality and/or performance of the grille. Accordingly, functionality and/or performance are sometimes compromised in favor of aesthetic design considerations.

Grilles and other openings, vents and ports in a vehicle can provide functional benefits including facilitating air-intake into an engine and/or providing air flow for cooling various vehicle systems and components. One or more shutter assemblies may be mounted to the vehicle proximate the grille and/or other openings in the body of the vehicle, to adjust aerodynamic characteristics and/or airflow into or out of the vehicle.

SUMMARY

This section provides a general summary of the disclosure, and is not a comprehensive disclosure of its full scope or all of its features.

The present disclosure provides a system that may include a first shutter assembly and a drive mechanism. The first shutter assembly may be adapted to be mounted proximate a first opening in a vehicle. The first shutter assembly may include a first louver movable between a first position allowing airflow through the first opening and a second position restricting airflow through the first opening. The drive mechanism may drive the first louver between the first and second positions. The drive mechanism may include a rotatable member, a motor and a first connecting member. The rotatable member may include a first arcuate groove extending at least partially around a rotational center of the rotatable member. The motor may drivingly engage the rotatable member. The first connecting member may include a first portion slidably engaging the first arcuate groove and a second portion connected to the first louver. The first connecting member may move the first louver between the first and second positions in response to relative movement between the first arcuate groove and the first portion.

In another form, the present disclosure provides a system that may include first and second louvers and a drive system. The first louver may be movable between first and second positions. The second louver may also be movable between first and second positions. The drive system may drive at least one of the first and second louvers between the first and second positions. The drive system may include a first member connected to the at least one of the first and second louvers, and a rotatable member having a first arcuate guide. The first arcuate guide may slidably engage the first member. The rotatable member may rotate to cause movement of the at least one of the first and second louvers.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIGS. 1-6, a system 10 is provided that may include a first shutter assembly 12, a second shutter assembly 14, and a drive assembly 16. The system 10 may be installed in a vehicle 18. The first and second shutter assemblies 12, 14 may be mounted adjacent one or more grille openings 20 in the vehicle 18. As will be subsequently described, the drive assembly 16 may selectively open and close one or both of the first and second shutter assemblies 12, 14 to control airflow through the one or more grille openings 20.

It should be appreciated that the vehicle 18 can be any type of vehicle having one or more openings in its body, including a car, pickup truck, sport utility vehicle, crossover vehicle, minivan, van, light commercial vehicle, heavy-duty commercial or industrial vehicle, military vehicle, construction or farm equipment or vehicle, or recreational vehicle, for example. Furthermore, it should be appreciated that the vehicle 18, regardless of the type or class of vehicle, could include an internal combustion engine, an electric motor, a hybrid powertrain (e.g., an internal combustion engine and an electric motor) and/or any other power source for powering the vehicle. It is also envisioned that the system 10 could be incorporated into a boat or aircraft. Furthermore, while the first and second shutter assemblies 12, 14 are described above as being mounted adjacent one or more grille openings 20 in the vehicle 18 to regulate airflow therethrough, in some embodiments, one or both of the first and second shutter assemblies 12, 14 could alternatively be disposed adjacent any other opening in the body of the vehicle 18, such as a hood scoop or a fender vent, for example.

Each of the first and second shutter assemblies 12, 14 may include a frame 22, one or more louvers 24 and one or more linkages 26. Each frame 22 may be disposed proximate one of the grille openings 20 in the vehicle 18. The linkages 26 may be mounted to the frame 22 and support the louvers 24. In some embodiments, the linkages 26 may include one or more hinges 28 that are rotatable relative to the frame 22 to allow the louvers 24 to rotate between an open position (shown in solid lines in FIG. 2) and a closed position (shown in phantom lines in FIG. 2). The hinges 28 may be connected to a link 30, which in turn, may be connected to the drive assembly 16 to facilitate movement of the louvers 24 between the open and closed positions. It will be appreciated that the first and second shutter assemblies 12, 14 could be otherwise configured to allow for movement of the louvers 24 between the open and closed positions to regulate airflow through the grille openings 20 of the vehicle 18. That is, any suitable linkage and/or frame structure could be connected to the louvers 24 to allow the drive assembly 16 to move the louvers 24.

Figure 1:
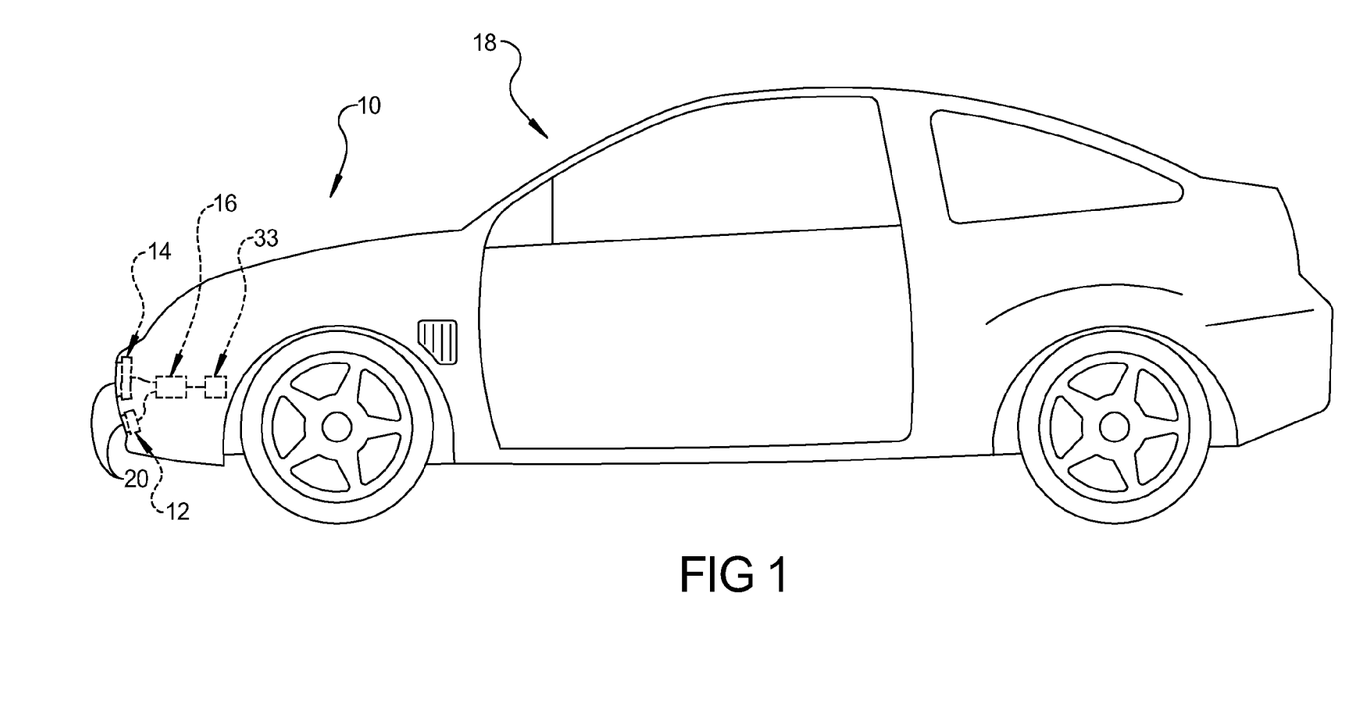
FIG. 1 is a schematic representation of a vehicle including an drive assembly and a plurality of shutter systems according to the principles of the present disclosure.

The drive assembly 16 may include an actuator assembly 32, a housing 34, a drive wheel 36, first and second connecting pins 38, 40, and first and second cables 41, 42. While FIG. 1 shows the drive assembly 16 being located proximate a front end of the vehicle 18 (e.g., between a front wheel well of the vehicle 18 and the shutter assemblies 14, 16), it will be appreciated that the drive assembly 16 could be located at any suitable location within the vehicle 18.

The actuator assembly 32 could include any suitable motor adapted to cause rotation of a drive shaft 44 in first and second directions. The actuator assembly 32 may receive electrical power from a dedicated battery, a vehicle battery, or any other power source. The actuator assembly 32 may be in communication with a control module 33 that causes movement of the actuator assembly 32 in response to various operating parameters of the vehicle 18, such as vehicle speed and/or temperatures of various components and/or fluids within the vehicle 18, for example. The control module 33 may refer to, be part of, or include an Application Specific Integrated Circuit (ASIC), an electronic circuit, a processor (shared, dedicated or group) and/or memory (shared, dedicated or group) that execute one or more software or firmware programs, a combinational logic circuit and/or other suitable components that provide the described functionality.

The housing 34 may be mounted to the actuator assembly 32 and may include a recess 45 and a plurality of generally parallel guide members 46 disposed on a base surface 47 within the recess 45. The guide members 46 may be integrally formed with the base surface 47. The guide members 46 may cooperate to define first and second tracks 48, 50 slidably receiving the first and second connecting pins 38, 40, respectively. In some embodiments, the housing 34 may include a cap that may at least partially encase the drive wheel 36, the connecting pins 38, 40 and/or portions of the cables 41, 42.

The drive wheel 36 may be a generally cylindrical member including first and second opposing sides 52, 54. The first side 52 may face the base surface 47 and may be spaced apart therefrom to allow clearance for a portion of the first connecting pin 38. The drive shaft 44 of the actuator assembly 32 may define an axis of rotation of the drive wheel 36 and may extend through the housing 34 and drivingly engage the drive wheel 36. In some embodiments, an outer periphery of the drive wheel 36 may include gear teeth that may be drivingly engaged by a transmission gear, which in turn, may be driven by an output shaft of the actuator assembly 32. Such a configuration may provide more torque for rotating the drive wheel 36 and may facilitate fine-tuned control of the rotational movement and positioning of the drive wheel 36 and the shutter assemblies 14, 16.

Figure 4:
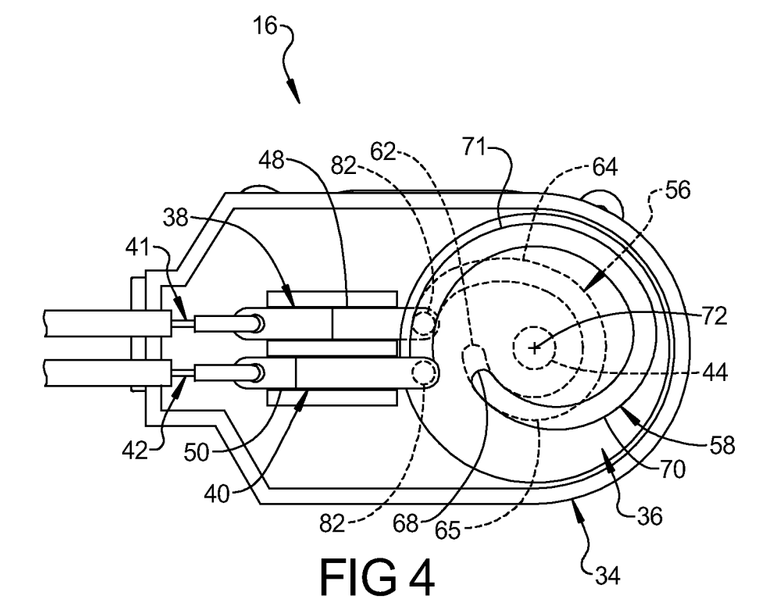
FIG. 4 is a plan view of the drive assembly in a first position according to the principles of the present disclosure.
Figure 5:
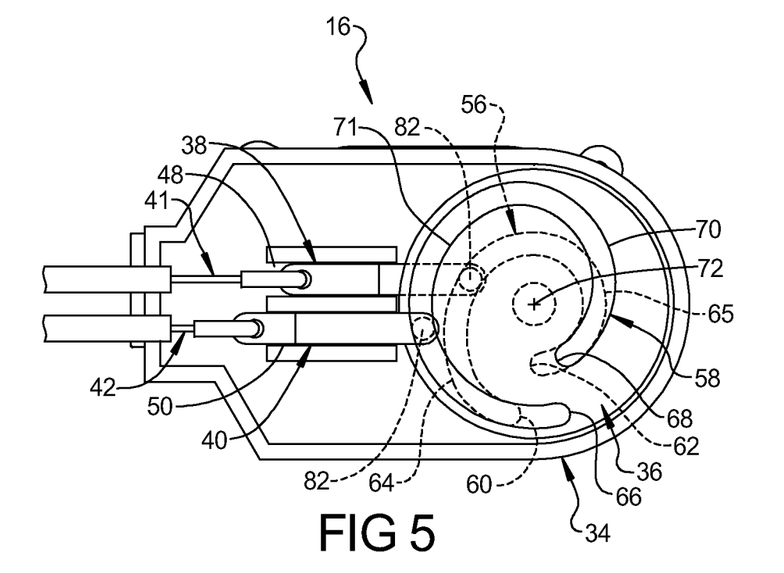
FIG. 5 is a plan view of the drive assembly of FIG. 4 in a second position.
Figure 6:
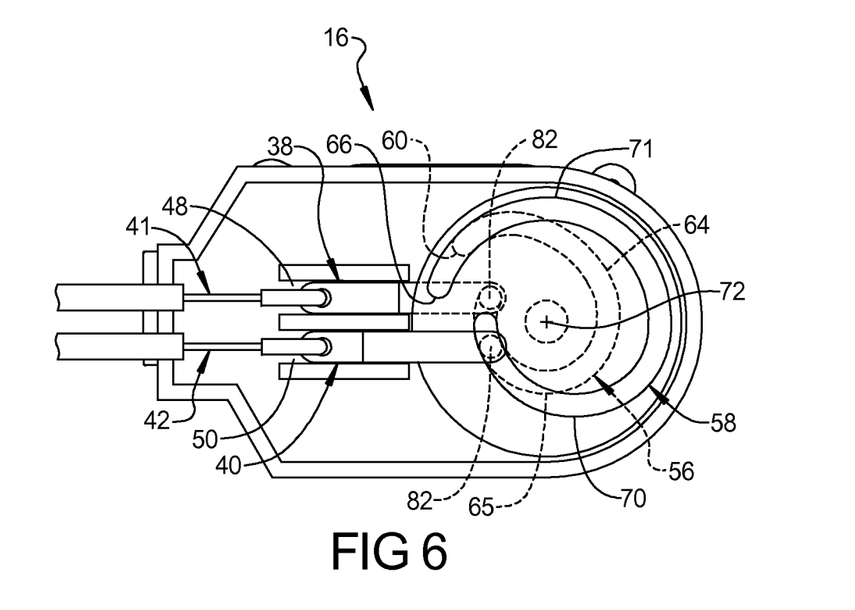
FIG. 6 is a plan view of the drive assembly of FIG. 4 in a third position.

The first and second sides 52, 54 of the drive wheel 36 may include first and second arcuate or generally spiral-shaped grooves 56, 58, respectively. The first groove 56 may include a radially outer end 60, radially inner end 62, a varying radius portion 64 and a constant radius portion 65 (FIGS. 4-6). Similarly, the second groove 58 may include a radially outer end 66, radially inner end 68, a varying radius portion 70, and a constant radius portion 71.

The radially outer ends 60, 66 of the grooves 56, 58 may both be a first distance from a rotational axis 72 of the drive wheel 36 and the radially inner ends 62, 68 may be a second distance from the rotational axis 72 of the drive wheel 36. The distance of the grooves 56, 58 from the rotational axis 72 at the varying radius portions 64, 70 decreases as the grooves 56, 58 extend toward the radially inner ends 62, 68. The distances of the grooves 56, 58 from the rotational axis 72 may remain substantially constant over the lengths of their constant radius portions 65, 71, respectively.

The varying radius portion 64 of the first grooves 56 may be disposed between the radially outer end 60 and the constant radius portion 65. Unlike the first groove 56, the varying radius portion 70 of the second groove 58 may be disposed between the constant radius portion 71 and the radially inner end 68. In this manner, the first and second grooves 56, 58 may be at least partially misaligned with each other in a direction parallel to the rotational axis 72, as shown in FIGS. 4-6.

The first and second connecting pins 38, 40 may slidably engage the first and second grooves 56, 58, respectively, and slidably engage the tracks 48, 50. In this manner, as the drive wheel 36 rotates, engagement between the first and second connecting pins 38, 40 and the first and second grooves 56, 58, respectively, causes the first and second connecting pins 38, 40 to move between a first position (FIG. 4) and a second position (FIG. 6).

Figure 3:
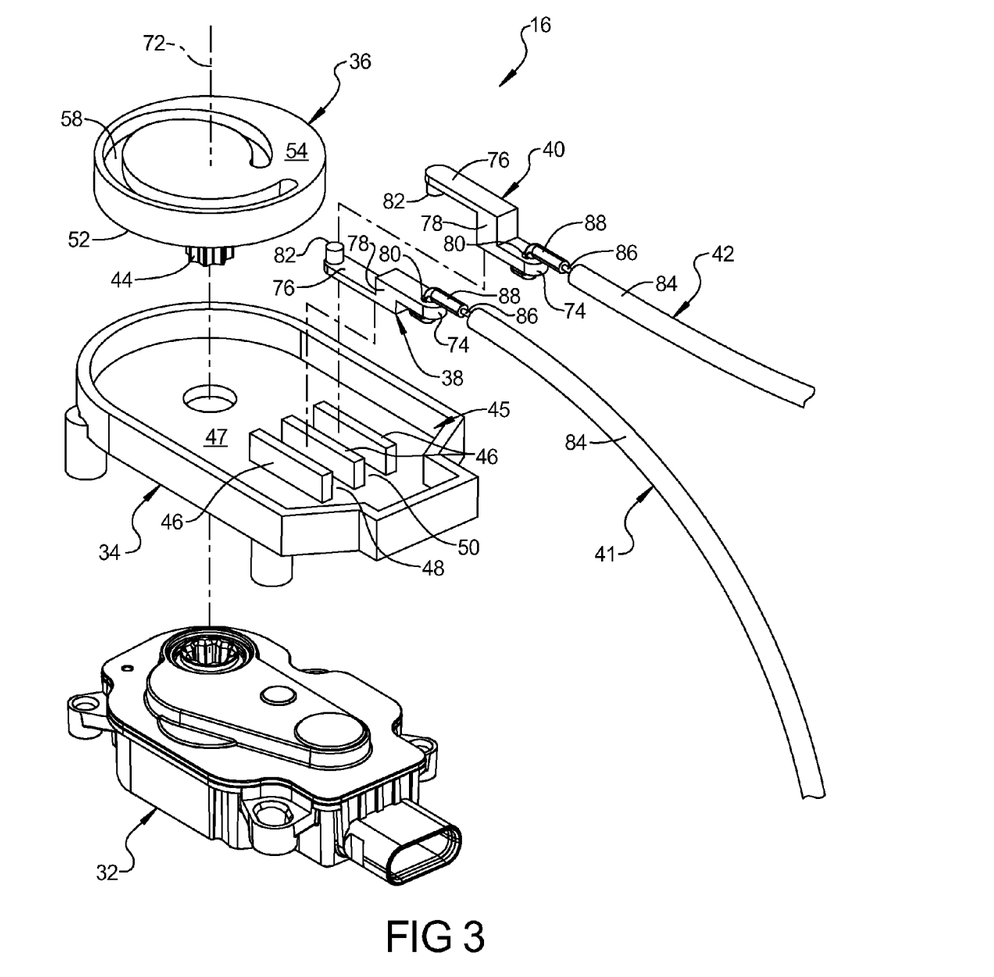
FIG. 3 is a partially exploded perspective view of the drive assembly according to the principles of the present disclosure.

Each of the first and second connecting pins 38, 40 may include a first end portion 74, a second end portion 76, and an intermediate portion 78 therebetween (FIG. 3). The intermediate portion 78 offsets the first end portion 74 from the second end portion 76 in a direction that is parallel to the rotational axis 72 of the drive wheel 36. The first end portion 74 may include an aperture 80 extending therethrough. The first end portions 74 of the first and second connecting pins 38, 40 slidably engage the tracks 48, 50 in the housing 34, respectively. The second end portion 76 may include a protrusion 82 extending therefrom.

While the structure of the first and second connecting pins 38, 40 may be substantially similar to each other, the first and second connecting pins 38, 40 may be oriented differently relative to the tracks 48, 50 in the housing 34. That is, the first connecting pin 38 may be oriented such that its intermediate portion 78 extends downward from the first end portion 74 (relative to the views shown in FIGS. 3-6) so that the second end portion 76 is disposed between the base surface 47 and the first side 52 of the housing 34. In this manner, the protrusion 82 of the first connecting pin 38 can extend upward to engage the first groove 56 on the first side 52 of the drive wheel 36. Conversely, the second connecting pin 40 may be oriented such that its intermediate portion 78 extends upward from the first end portion 74 (relative to the views shown in FIGS. 3-6) so that the protrusion 82 of the second connecting pin 40 can extend downward to engage the second groove 58 on the second side 54 of the drive wheel 36.

The first and second cables 41, 42 may couple the first and second connecting pins 38, 40 with the first and second shutter assemblies 12, 14, respectively. The first and second cables 41, 42 may be relatively rigid metallic cables, such as push-pull control cables, for example, and may be slidably received in relatively rigid polymeric sleeves 84. The first and second cables 41, 42 may be configured to transmit forces in two opposing directions, i.e., to pull the first and second shutter assemblies 14, 16 toward the closed position and to push the first and second shutter assemblies 14, 16 toward the open position.

Figure 2:
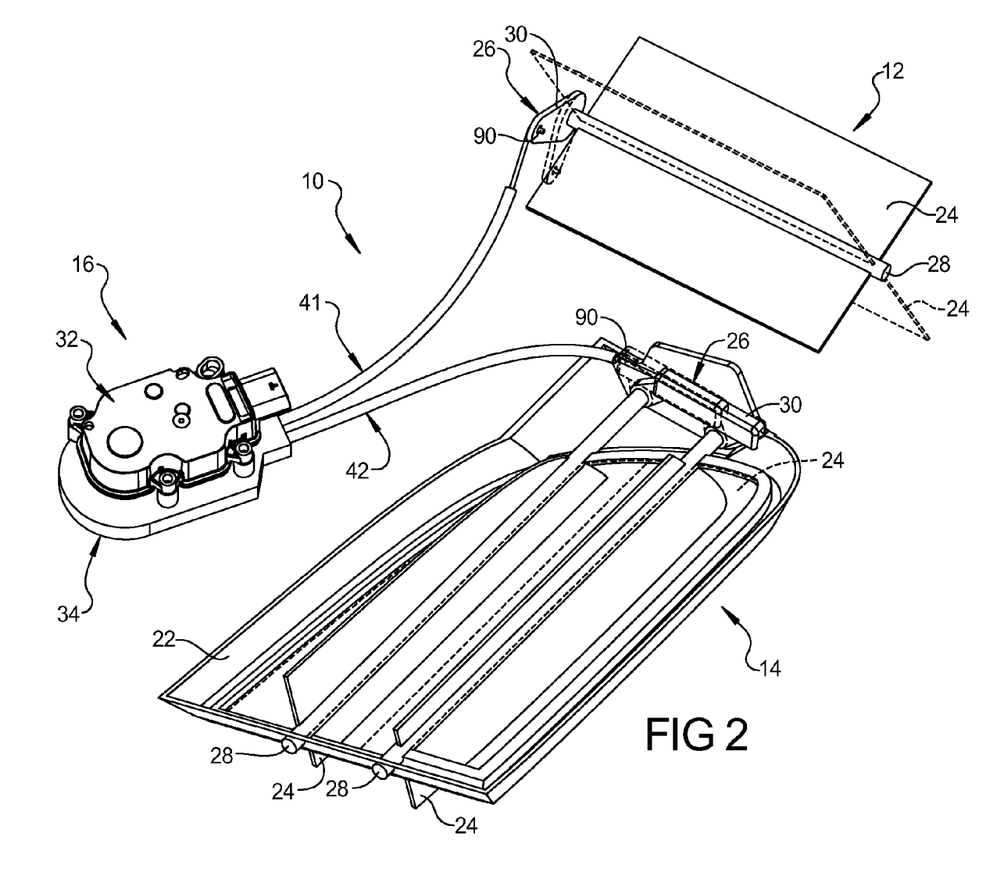
FIG. 2 is a perspective view of the drive assembly and shutter assemblies of FIG. 1.

First ends 86 of the first and second cables 41, 42 may engage the apertures 80 in the first end portions 74 of the first and second connecting pins 38, 40, respectively. In some embodiments, the first ends 86 of the cables 41, 42 may include a generally S-shaped or Z-shaped member 88 that engages the apertures 80. In other embodiments, the first ends 86 of the cables 41, 42 may be integrally formed with the first and second connecting pins 38, 40, respectively, via a molding process, for example. Any other suitable means of joining the first ends 86 of the cables 41, 42 to the respective connecting pins 38, 40 could be employed. As shown in FIG. 2, second ends 90 of the first and second cables 41, 42 may engage the link 30, for example, or any other component of the linkage 26. In this manner, movement of the connecting pins 38, 40 causes corresponding movement of the linkages 26 and the louvers 24 of the first and second shutter assemblies 12, 14, respectively.

With continued reference to FIGS. 1-6, operation of the drive assembly 16 will be described in detail. As described above, the drive assembly 16 may selectively move the first and second shutter assemblies 12, 14 between the open and closed positions or to any position between the fully open position and the fully closed position to control airflow through the one or more grille openings 20. In response to one or more predetermined operating conditions the control module 33 may send a signal to the actuator assembly 32 causing the actuator assembly 32 to rotate the drive shaft 44 in one of the first and second directions about the rotational axis 72. As will be described, rotation of the drive shaft 44 causes corresponding rotation of the drive wheel 36, which in turn causes motion of the cables 41, 42. Motion of the cables 41, 42 causes corresponding movement of the linkages 26, which rotates the louvers 24 between the open and closed positions.

In a first position shown in FIG. 4, the first and second connecting pins 38, 40 may engage the first and second grooves 56, 58, respectively, at or proximate the radially outer ends 60, 66, respectively. This first position may correspond to an open position of the louvers 24 (shown in solid lines in FIG. 2). Rotation of the drive wheel 36 in a counterclockwise direction (relative to the views shown in FIGS. 4-6) from the first position may cause linear displacement of the first connecting pin 38 toward the rotational axis 72, while the second connecting pin 40 may remain stationary, as shown in FIG. 5. This is due to the configuration of the first and second grooves 56, 58. Specifically, because the varying radius portion 64 of the first groove 56 is adjacent the radially outer end 60, initial movement of the drive wheel 36 from the first position causes corresponding movement of the first connecting pin 38 as the protrusion 82 slides along the varying radius portion 64. By the time the protrusion 82 of the first connecting pin 38 engages the constant radius portion 65 of the first groove 56, the first connecting pin 38 may have displaced linearly a sufficient amount to move the louvers 24 of the first shutter assembly 12 to the closed position (shown in phantom lines in FIG. 2). However, because the constant radius portion 71 of the second groove 58 is adjacent the radially outer end 66, the initial displacement of the drive wheel 36 shown in FIG. 5 does not result in linear displacement of the second connecting pin 40 as the protrusion 82 slides along the constant radius portion 71.

Continued rotation of the drive wheel 36 in the counter-clockwise direction (FIG. 6) causes the protrusion 82 of the first connecting pin 38 to slide through the constant radius portion 65 of the first groove 56 and causes the protrusion 82 of the second connecting pin 40 to slide through the varying radius portion 70 of the second groove 58. The first connecting pin 38 does not move linearly while the protrusion 82 of the first connecting pin 38 is sliding through the constant radius portion 65 of the first groove 56. The second connecting pin 40, however, does move linearly toward the rotational axis 72 while the protrusion 82 of the second connecting pin 40 is sliding through the varying radius portion 70 of the second groove 58. By the time the protrusion 82 of the second connecting pin 40 engages the radially inner end 68 of the second groove 58, the second connecting pin 40 may have displaced linearly a sufficient amount to move the louvers 24 of the second shutter assembly 14 to the closed position (shown in phantom lines in FIG. 2).

Subsequent rotation of the drive wheel 36 in a clockwise direction (relative to the views shown in FIG. 4-6) causes the displacement of the second connecting pin 40 and then the first connecting pin 38 back toward the position shown in FIG. 4 to move the louvers 24 of the first and second shutter assemblies 12, 14, respectively back to their open positions (shown in solid lines in FIG. 2) in a reverse order as the sequence described above.

In this manner, the configuration of the grooves 56, 58 of the drive wheel 36 causes sequenced and independent movement of the first and second connecting pins 38, 40 relative to each other, and thus, sequenced and independent movement of the louvers 24 of the first and second shutter assemblies 12, 14, respectively, relative to each other. That is, the configuration of the grooves 56, 58 causes motion of the first and second shutter assemblies 12, 14 "in series."

It will be appreciated that the control module 33 may stop motion or reverse the rotational direction of the actuator assembly 32 at any point during the rotation of the drive wheel 36 to maintain the shutter assemblies 12, 14 in their present positions or move them back to a previous position. For example, after moving the first second shutter assembly 12 to the closed position, the control module 33 may cause the actuator assembly 32 to stop for a period of time before the continuing to rotation of the drive wheel 36 to close the second shutter assembly 14. As another example, after moving the first shutter assembly 12 toward the closed position, the control module 33 may cause the actuator assembly 32 to reverse its rotational direction to move the first shutter assembly 12 back toward the open position, all the while, keeping the second shutter assembly 14 motionless. It will be appreciated that other sequences of operations could be performed to adjust the positions of the first and/or second shutter assemblies 12, 14.

Figure 7:
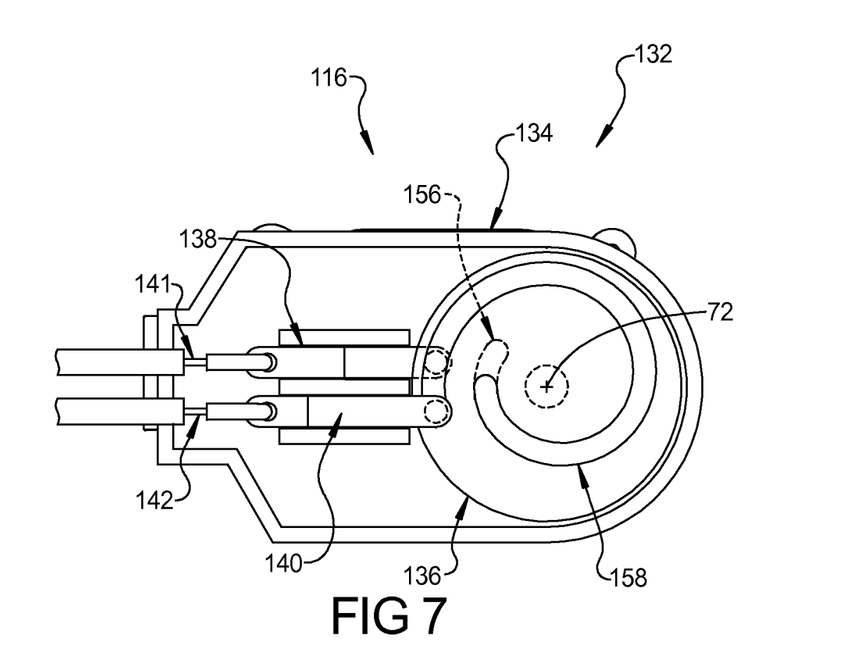
FIG. 7 is a plan view of another drive assembly according to the principles of the present disclosure.

Referring now to FIG. 7, another drive assembly 116 is provided that may be operable to move the louvers 24 of the first and second shutter assemblies 12, 14 between the open and closed positions substantially "in parallel" rather than in series as described above. The drive assembly 116 may include an actuator assembly 132, a housing 134, a drive wheel 136, connecting pins 138, 140, and cables 141, 142. The structure and function of the actuator assembly 132, housing 134, connecting pins 138, 140, and cables 141, 142 may be substantially identical to the actuator assembly 32, housing 34, connecting pins 38, 40, and cables 41, 42 described above, and therefore will not be described again in detail. The drive wheel 136 may be substantially similar to the drive wheel 36 described above, apart from exceptions noted herein.

Like the drive wheel 36 described above, the drive wheel 136 may include first and second grooves 156, 158 disposed on opposite sides thereof. However, unlike the grooves 56, 58, the first and second grooves 156, 158 may be generally aligned with each other in a direction parallel to the rotational axis of the drive wheel 136. That is, the radii of the grooves 156, 158 varying at substantially the same rate. In this manner, the first and second connecting pins 138, 140 may move substantially "in parallel" or at substantially the same time and at substantially the same rate in response to movement of the drive wheel 136. Stated another way, the louvers 24 of the first and second shutter assemblies 12, 14 may move between the open and closed positions substantially in-sync with each other.

It will be appreciated that the grooves 56, 58, 156, 158 of the drive wheels 36, 136, respectively, could be shaped and/or configured differently than described above. That is, the shapes of the first and/or second grooves and/or the alignment (or misalignment) of the first and second grooves relative to each other can be configured to provide ranges of motion, rates of motion, and/or sequences of motion of the first and/or second shutter assemblies 12, 14 to suit a given application. In some embodiments, the grooves 56, 58, 156, 158 could be formed such that continued rotation of the drive wheel 36, 136 in a single direction could cause the first and second connecting pins 38, 40, 138, 140 to move from the first position to the second position and back to the first position.

Furthermore, while the drive assembly 16, 116 is described herein as being operatively connected to two shutter assemblies 12, 14 for movement of the louvers 24 between open and closed positions, in some embodiments, the drive assembly 16, 116 may be configured to move any number of shutter assemblies and/or any other movable mechanisms between first and second positions. Therefore, the principles of the present disclosure are not limited in application to vehicles or actuation of shutter assemblies within a vehicle. In some embodiments, the drive wheel 36, 136 may include additional grooves engaging additional cables connected to additional movable mechanisms. In some embodiments, the actuator assembly 32, 132 may drive a plurality of drive wheels each having one or more grooves for causing movement of a plurality of movable mechanisms. In some embodiments, movement of two or more cables may be guided by the same groove. In some embodiments, one cable may be operatively connected to a plurality of movable mechanisms.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for a vehicle comprising:
   a first shutter assembly adapted to be mounted proximate a first opening in the vehicle and having a first louver movable between a first position allowing airflow through the first opening in the vehicle and a second position restricting airflow through the first opening;

a second shutter assembly adapted to be mounted to the vehicle proximate a second opening in the vehicle and having a second louver movable between a first position allowing airflow through the second opening and a second position restricting airflow through the second opening; and a drive mechanism driving said first and second louvers between said first and second positions, said drive mechanism including:

a rotatable member including first and second arcuate grooves extending at least partially around a rotational center of said rotatable member;

a motor drivingly engaging said rotatable member;

a first connecting member having a first portion slidably engaging said first arcuate groove and a second portion connected to said first louver, said first connecting member moving said first louver between said first and second positions in response to relative movement between said first arcuate groove and said first portion of said first connecting member; and a second connecting member having a first portion engaging said second arcuate groove and a second portion connected to said second louver.

2. The system of claim 1, wherein said first shutter assembly includes a second louver, said first connecting member being drivingly coupled to said second louver to move said second louver between said first and second positions.

3. The system of claim 1, wherein a portion of said first arcuate groove includes a non-constant radius.

4. The system of claim 3, wherein at least another portion of said first arcuate groove includes a constant radius.

5. The system of claim 1, wherein rotation of said rotatable member between a first angular position and a second angular position causes movement of one of said first and second connecting members relative to the other of said first and second connecting members.

6. The system of claim 1, wherein rotation of said rotatable member between a first angular position and a second angular position causes concurrent movement of said first and second connecting members.

7. A system comprising:
a first louver movable between first and second positions;
a second louver movable between first and second positions; and
a drive system driving said first and second louvers between said first and second positions, said drive system including first and second members connected to said first and second louvers, respectively, and a rotatable member having a first arcuate guide slidably engaging the first member and a second arcuate guide slidably engaging the second member and rotating to cause movement of said first and second louvers, wherein said first louver is adapted to be mounted proximate a first opening in a vehicle and allows airflow through the first opening in said first position and restricts airflow through the first opening in said second position, and wherein said second louver is adapted to be mounted proximate a second opening in the vehicle and allows airflow through the second opening in said first position and restricts airflow through the second opening in said second position.

8. The system of claim 7, wherein said first and second arcuate guides are generally aligned with each other.

9. The system of claim 7, wherein said first and second arcuate guides are at least partially misaligned with each other.

10. The system of claim 9, wherein at least a portion of said first arcuate guide includes a constant radius and at least a portion of said second arcuate guide that is angularly aligned with said portion of said first arcuate guide includes a non-constant radius.

11. The system of claim 7, wherein said first arcuate guide includes a first end and a second end, said first end being disposed at a first distance from an axis of rotation of said rotatable member, said second end being disposed at a second distance from said axis of rotation.

12. The system of claim 11, wherein rotational movement of said rotatable member causes corresponding linear movement of said first member.

13. A system comprising:
a first louver movable between first and second positions;
a second louver movable between first and second positions; and
a drive mechanism driving said first and second louvers between said first and second positions and including a motor, a shaft driven by said motor, a drive member coupled to said shaft, and first and second links connecting said drive member with said first and second louvers, respectively, said drive member being rotatable about an axis extending through said shaft and including a first arcuate slot slidably engaging said first link and a second arcuate slot slidably engaging said second link such that said first and second links move linearly in response to rotation of said drive member.

14. The system of claim 13, wherein the drive member includes a first side in which said first arcuate slot is disposed and a second side in which said second arcuate slot is disposed, said first and second arcuate slots extending around said axis and each having a first end and a second end, said first ends of said first and second arcuate slots both being a first radial distance from said axis and said second ends of said first and second arcuate slots both being a second radial distance from said axis.

15. The system of claim 14, wherein said first and second links simultaneously engage said first and second arcuate slots at said first ends when said drive member is at a first predetermined rotational position relative to said first and second links, said first predetermined rotational position corresponding to said first positions of said first and second louvers.

16. The system of claim 15, wherein said first and second links simultaneously engage said first and second arcuate slots at said second ends when said drive member is at a second predetermined rotational position relative to said first and second links, said second predetermined rotational position corresponding to said second positions of said first and second louvers.

17. The system of claim 16, wherein said first arcuate slot includes a first intermediate location disposed at a third radial distance from said axis, and said second arcuate slot includes a second intermediate location disposed at a fourth radial distance from said axis, said third radial distance is less than said first radial distance and greater than said second radial distance, said fourth radial distance is less than said third radial distance and greater than said second radial distance, and wherein said first and second links simultaneously engage said first and second arcuate slots at said first and second intermediate locations, respectively, when said drive member is at a third predetermined rotational position relative to said first and second links.

18. The system of claim 17, wherein said third predetermined rotational position corresponds to a third position of said first louver and a fourth position of said second louver.

19. The system of claim 14, wherein said first and second arcuate slots extend only partially through a thickness of said drive member such that said first arcuate slot extends only through said first side of said drive member and said second arcuate slot extends only through said second side of said drive member.

20. The system of claim 13, wherein said first and second arcuate slots each include variable-radius portions and constant-radius portions, wherein at a predetermined rotational position of said drive member, said first link engages said variable-radius portion of said first arcuate slot and said second link engages said constant-radius portion of said second arcuate slot.

21. The system of claim 20, wherein rotation of said drive member causes no corresponding movement of said first louver while said first link slidably engages said constant-radius portion, and wherein rotation of said drive member causes corresponding movement of said second louver while said second link slidably engages said variable-radius portion.

22. The system of claim 13, wherein said first louver is adapted to restrict airflow through a first opening in a vehicle in the first position and allow airflow through the first opening in the second position.

23. The system of claim 22, wherein said second louver is adapted to restrict airflow through a second opening in a vehicle in the first position and allow airflow through the second opening in the second position.

* * * * *